(12) United States Patent
Norberg et al.

(10) Patent No.: US 12,441,193 B2
(45) Date of Patent: Oct. 14, 2025

(54) REDUNDANT POWER SUPPLY (71) Applicant: Polestar Performance AB, Gothenburg (SE)

(72) Inventors: Olof Norberg, Gothenburg (SE); Niklas Roos, Gothenburg (SE); Johan Gerard Hageman, Gothenburg (SE); Robert Wassmur, Gothenburg (SE)

(73) Assignee: Polestar Performance AB, Gothenburg (SE)

( * ) Notice: Subject to any disclaimer, the term of this patent is extended or adjusted under 35 U.S.C. 154(b) by 0 days.

(21) Appl. No.: 17/448,782

(22) Filed: Sep. 24, 2021

(65) Prior Publication Data

US 2022/0089030 A1 Mar. 24, 2022

Related U.S. Application Data

(60) Provisional application No. 63/198,022, filed on Sep. 24, 2020.

(51) Int. Cl.
| | |
|---|---|
| *B60L 3/00* | (2019.01) |
| *B60L 50/60* | (2019.01) |
| *B60L 58/18* | (2019.01) |
| *H02J 7/00* | (2006.01) |
| *H02J 9/06* | (2006.01) |

(52) U.S. Cl.
CPC .............. *B60L 3/0023* (2013.01); *B60L 50/60* (2019.02); *B60L 58/18* (2019.02); *H02J 7/0013* (2013.01); *H02J 7/0029* (2013.01); *H02J 7/0063* (2013.01); *H02J 9/061* (2013.01); *B60L 2210/10* (2013.01)

(58) Field of Classification Search
CPC ........ B60L 3/0023; B60L 58/18; B60L 50/60; B60L 2210/10; H02J 7/0013; H02J 7/0063; H02J 9/061
USPC ......................................................... 307/108
See application file for complete search history.

(56) References Cited

U.S. PATENT DOCUMENTS

| | | | | |
|---|---|---|---|---|
| 2004/0099234 | A1* | 5/2004 | Tamai | B60W 20/10 123/179.3 |
| 2005/0242775 | A1* | 11/2005 | Miyazaki | B60L 58/21 320/116 |
| 2013/0033793 | A1* | 2/2013 | Takeda | G01R 31/396 361/91.1 |
| 2014/0265554 | A1 | 9/2014 | Yang et al. | |
| 2017/0214099 | A1 | 7/2017 | Fleming et al. | |
| 2018/0050597 | A1 | 2/2018 | Hand, III et al. | |

(Continued)

FOREIGN PATENT DOCUMENTS

| | | |
|---|---|---|
| CN | 208842235 U | 5/2019 |
| CN | 110228369 A | 9/2019 |

(Continued)

OTHER PUBLICATIONS

"Extended European Search Report", Jan. 24, 2025, 10 pages.

(Continued)

*Primary Examiner* — Rexford N Barnie
*Assistant Examiner* — Swarna N Chowdhuri
(74) *Attorney, Agent, or Firm* — Kilpatrick Townsend & Stockton LLP (57) ABSTRACT

A system as described herein can be used to maintain safety features for an electric vehicle. These features include redundant low-voltage power provision and redundant cooling, each provided by use of multiple battery strings.

16 Claims, 7 Drawing Sheets

(56) References Cited

U.S. PATENT DOCUMENTS

| | | | |
|---|---|---|---|
| 2018/0334118 A1* | 11/2018 | Masui | H02J 7/00 |
| 2019/0100111 A1* | 4/2019 | Liu | B60R 16/033 |
| 2020/0055404 A1* | 2/2020 | Conlon | B60L 53/14 |
| 2021/0206275 A1* | 7/2021 | Mahmoud | B62D 1/184 |
| 2022/0212655 A1* | 7/2022 | Johnson | B60W 20/30 |

FOREIGN PATENT DOCUMENTS

| | | |
|---|---|---|
| CN | 110290973 A | 9/2019 |
| CN | 110481468 A | 11/2019 |
| CN | 110816299 A | 2/2020 |
| EP | 3360719 A1 | 8/2018 |
| WO | 2019082776 A1 | 5/2019 |
| WO | 2020068641 A1 | 4/2020 |

OTHER PUBLICATIONS

Application No. PCT/US2021/071590, International Search Report and Written Opinion, Mailed on Feb. 25, 2022, 12 pages.
Office Action issued in corresponding Chinese Patent Application No. 202180078482.0 on Aug. 8, 2025; 19 pages.

\* cited by examiner

REDUNDANT POWER SUPPLY

RELATED APPLICATION INFORMATION

This application claims the benefit of U.S. Provisional Application No. 63/198,022, filed Sep. 24, 2020, the contents of which are fully incorporated herein by reference.

TECHNICAL FIELD

The present disclosure relates generally to batteries and battery systems for electric vehicles, and more particularly to a high-voltage electric vehicle battery having redundant mechanisms for providing a stepped down output to power loads at various voltages.

BACKGROUND

Hybrid and electric vehicles are becoming increasingly popular as consumers look to decrease their environmental impact and improve air quality. Instead of a traditional internal combustion engine, hybrid and electric vehicles include one or more motors, powered by a rechargeable battery pack. Most rechargeable battery packs are made up of one or more battery modules, each module containing a plurality of battery cells. Based on power requirements and consumer demand, rechargeable battery packs have tended towards higher operating voltages. For example, based on Ohm's law (e.g., $P=V^2/R$), doubling the voltage of the rechargeable battery pack approximately quadruples the power output (assuming a similar resistance of the one or more motors). Accordingly, whereas battery packs for electric vehicles traditionally tended to be in the 200-400 V range, newer electric vehicles may include high-voltage battery systems with outputs much higher, such as around 800 V, so that a motor having equivalent internal resistance will output much higher power levels.

By contrast, many vehicle accessories (e.g., power locks, power windows, occupant safety systems, cooling systems, etc.) are designed to operate on a 12 V system. As such, many hybrid and electric vehicles include a 12 V battery to provide power to the vehicle accessories. Likewise, some devices designed to be usable in multiple different vehicles can operate at a range of voltages, or may have been designed for lower voltage vehicles that output 200-400V. These devices can include air conditioning systems, battery chilling, steering, or other such systems that require higher power output than a typical 12V accessory but have not historically been operated at 800V or more.

Although increasing the voltage of modern electric vehicles has proven effective in meeting vehicle performance power demands, the use of such high-voltage systems presents a technical challenge in that the step-down from high voltage to low voltage (e.g., 800V to 12V) requires a substantially sized transformer that adds weight, cost, and complexity to the vehicle. While maintaining a separate 12V battery would solve some of these problems, failure of such a low-voltage battery may render accessories unavailable, and could require further expensive, heavy features (such as an alternator) to maintain a state of charge.

Moreover, in rare circumstances, a runaway chemical reaction within a damaged battery cell from the high-voltage systems can cause the cell to overheat. In extreme circumstances, the propagation of heat from the cell experiencing a thermal event can transfer to adjacent cells thereby raising the temperature of the adjacent cells, resulting in propagation of the thermal event throughout the battery pack (sometimes referred to as a "thermal runaway"), potentially consuming the entire electric vehicle. In these circumstances, it is important to consider the availability of the accessories operating at all voltage levels, and what effects each of them going offline could have.

The present disclosure addresses these concerns.

SUMMARY OF THE DISCLOSURE

Embodiments of the present disclosure provide a redundant power supply for providing low-voltage power from a high-voltage battery system. The high-voltage battery system described herein includes multiple strings that combine to form a high-voltage output when arranged in series. The systems described herein further include a DC/DC converter having at least two inputs. These inputs can each be coupled to a corresponding one of the high voltage battery strings, and the transformer produces a single low voltage output. For example, an 800 V battery can include two 400V strings, each string separately coupled to its own input to a DC/DC transformer (referred to herein as a "converter" interchangeably") that has a single 12 V output. Accordingly, the DC/DC converter can selectively provide a consistent 12V power output, when connected to any one of the separate 400 V strings of the 800 V battery module. Thus, in embodiments a plurality of DCDC converters with a combined low-voltage output can each be connected to a separate string of a high-voltage battery module. It should be understood that these values are provided as an example only, and that any number of strings could be combined to form the high-voltage output. For example, an electric motor that operates at 900V could receive power in series from three 300V strings, each of which is coupled to the same (or different) DC/DC transformer(s) to provide low-voltage output such as 5V, 12V, or 20V. In embodiments, the strings may not even be identically sized. An 800V high voltage output can easily be provided by one 400V string and two 200V strings, for example.

Moreover, embodiments of the present disclosure can provide passive balancing due to a higher power output from a string that has a higher voltage, as well as a redundant system such that the loss of a single high-voltage string connection will not interrupt low voltage output. Embodiments can enable continuous low-voltage output even during high voltage charging, and can provide power to evasive maneuvering systems.

According to a first embodiment, a power supply system includes a first battery string configured to provide power at a first voltage. The system further includes a second battery string configured to provide power at a second voltage. The system includes a transformer configured to receive power at the first voltage from the first battery string, and configured to receive power at the second voltage from the second battery string. The system also includes a drive system. A relay is configured to selectively couple the first battery string and the second battery string to deliver power to the drive system at a voltage equal to the sum of the first voltage and the second voltage.

According to another embodiment, a power supply system includes a first battery string configured to provide power at a first voltage; a second battery string configured to provide power at a second voltage; and a drive system similar to those described in the first embodiment. Furthermore, the second embodiment includes a high voltage junction box, and a relay configured to selectively couple the first battery string and the second battery string. The relay is configured such that in a normal operating condition the relay delivers power to both the drive system and the junction box at a voltage equal to the sum of the first voltage and the second voltage. In an abnormal operating condition the relay delivers power to the junction box at one of the first voltage and the second voltage.

The first voltage and the second voltage of both embodiments can be the same or they can be different from one another. The transformer can be configured to output power at a low voltage level. The low voltage level can be 12V. The power supply system can further include a low voltage bus. The low voltage bus can be configured to power one or more of the group consisting of: a window motor, a door lock, a door handle, a navigation system, and a communication system. The first voltage and the second voltage can both be 400V. The first battery string and the second battery string can each include multiple battery modules in series.

The power supply system can also include a condenser coupled to the junction box, and the compressor can be configured to operate at either of the first voltage, the second voltage, or the sum of the first voltage and the second voltage. The condenser can create a cooled fluid. The system (or a vehicle in which the system is arranged) can include a plurality of valves and pipes, wherein the plurality of valves and pipes are configured to selectively deliver the cooled fluid to the first battery string, the second battery string, and the drive system. A vehicle comprising the power supply system need not have a separate low-voltage battery or system.

According to another embodiment, a method for supplying a low-voltage direct current output from at a high-voltage battery system is described. The method includes providing a first power output having a first voltage from a first battery string; providing a second power output having a second voltage from a second battery string; selectively combining, via a relay, the first power output and the second power output, such that in a normal operating condition the relay delivers power to both the drive system and the junction box at a voltage equal to the sum of the first voltage and the second voltage; and in an abnormal operating condition the relay delivers power to the junction box at one of the first voltage and the second voltage.

According to another embodiment, a method for supplying a low-voltage direct current output from at a high-voltage battery system includes providing a first power output from a first battery string configured to provide power at a first voltage; providing a second power output from a second battery string configured to provide power at a second voltage; providing a transformer coupled to both the first battery string and the second battery string, wherein the transformer receives power at the first voltage from the first battery string and also receives power at the second voltage from the second battery string; providing a drive system; and providing a relay configured to selectively couple the first battery string and the second battery string to deliver power to the drive system at a voltage equal to the sum of the first voltage and the second voltage.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

As described herein, battery and circuitry arrangements are used to provide relatively high voltage to propulsion systems while maintaining extremely stable and reliable access to low-voltage power. This is accomplished without requiring bulky, expensive transformers to transform power from the very high voltage levels to low voltage, and without requiring the components of a separate or isolated low-voltage battery system. Additionally, the embodiments described herein can provide power at various intermediate voltage levels.

Throughout this application, some terms are used to refer to voltage levels that are consistent with present-day electric vehicles.

For example, "low voltage" is used to refer to the voltage levels typically used to power accessories like speakers, console displays, door locks, window motors, defroster wires, fans, seat heaters, wired and wireless rechargers and outlets, and the like. "Low voltage," as used throughout this application, typically refers to anything at or under 230V (i.e., European standard operating voltage), but more at 12V (standard accessory operating bus voltage) or even 5V (used for systems such as phone chargers and other similarly-sized electronics).

Likewise, "mid-range voltage" refers to voltage in the range typically used for propulsion in existing electrical vehicles. "Mid-range voltage" refers to power levels that are usable for propulsion, and may have been in some modern vehicles, but which are below high voltage levels (see below). Mid-range voltage can be, for example, 202V (used in drivetrains for hybrid vehicles such as the Toyota Prius), 375V (used in modern all-electric drivetrains such as the Tesla Model S and Model 3), 389V (used in the Jaguar I-Pace) or other voltages in this range.

Finally, "high voltage" refers to the voltage levels that are beginning to be used in modern all-electric drivetrains. These vastly exceed the mid-range voltages, recognizing that the power output of the same electric motor increases substantially exponentially with increased input voltage. Such high voltage systems are used in next-generation vehicles produced by the applicant, Polestar.

Generally speaking, for the purposes of this application and subject to the details above, it can be assumed that "low voltage" is equal to or less than 200V, "mid-range voltage" refers to voltages above 200V and below 400V, and "high voltage" refers to voltages at or above 400V. However, it should be understood that in future the operating voltages of electrical vehicles may increase. This is due to the expected increases in nominal power output and energy storage within battery packs, as well as the incentive to increase operating voltage described above for purposes of power output. Therefore it is fully expected that in future, "high voltage" in the electrical vehicle context could reach much higher, such as thousands of volts, and "mid-range voltages" would still refer to the entire range of voltages between those high-voltage values used for propulsion and the low-voltage values used for accessories like door locks and window motors. The principles described within this application apply equally as typically-used voltage ranges vary, as they are expected to over time.

Throughout this application, ranges such as the voltages above are described as being "about," "substantially," or "approximately" equal to a certain value. It should be understood that battery power output and voltage varies according to understood design tolerances and are not exact. Furthermore, the voltages or power output of a particular battery system can be subject to change with a variety of different conditions, such as the state of charge, the battery temperature, load level (either existing or historical), wear and tear or age of the battery, resistance of connecting electrical components and conductors, etc. When a level is referred to as "about," "substantially," or "approximately" equal to a certain value it is meant that the value is the nominal one, subject to such normal variations.

Figure 1:
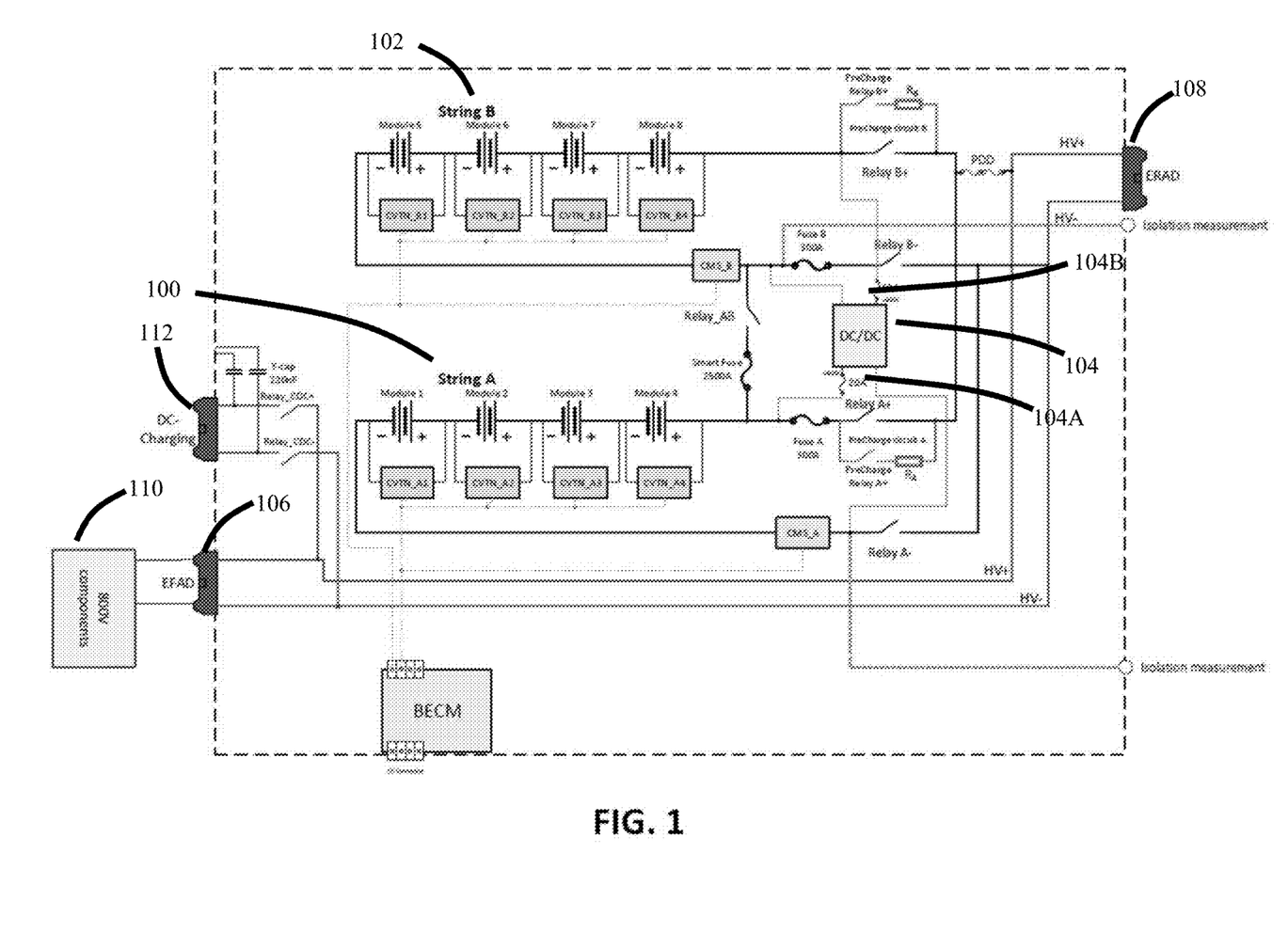
FIG. 1 is a schematic diagram depicting a high-voltage battery system for electric vehicle comprising redundant low-voltage vehicle accessory power supplies, in accordance with an embodiment of the disclosure.

FIG. 1 shows an example schematic of a battery and electrification scheme, according to an embodiment. FIG. 1 shows a first battery string 100, a second battery string 102, each of which includes four modules (depicted with the conventional symbol for a voltage supply) arranged in series. In modern battery architecture, each of the four modules could be 100V, for example, such that the first battery string 100 and the second battery string 102 each have a net voltage of approximately 400V. However, in alternative embodiments each module could have a different voltage, or a different number of modules could be used in each of the first battery string 100 and the second battery string 102 to result in a different net output voltage.

FIG. 1 also shows DC/DC transformer 104. DC/DC transformer 104 can be used to create low-voltage output. DC/DC transformer 104 can be powered to produce a 12V output, for example. DC/DC transformer 104 has inputs 104A and 104B that correspond to first battery string 100 and second battery string, respectively. The output of DC/DC transformer 104 is not shown in FIG. 1 for purposes of clarity, but a 12V power supply can be used for any of a wide variety of purposes. For example, 12V power can be used for accessories like speakers, console displays, door locks, window motors, defroster wires, fans, seat heaters, wired and wireless rechargers and outlets. Additional step-up or step-down transformers can be used that modify the output from DC/DC transformer 104 that are not depicted in FIG. 1, such as a further step-down transformer to output 5V power from a USB port or phone charger, or a step-up transformer to operate a higher-voltage seat or steering-wheel heater, console display, or wireless router for in-vehicle internet or communications.

FIG. 1 also shows an electric front axle drive (EFAD) 106 and an electronic rear axle drive (ERAD) 108. Each of the EFAD and ERAD are for propulsion purposes. That is, power can be routed to the front of a vehicle and the back of the vehicle at EFAD 106 and ERAD 108, respectively, to be used to move the vehicle. In 2-wheel drive vehicles, either of the EFAD 106 or the ERAD 108 may be omitted. The EFAD 106 and ERAD 108 are configured to operate at high voltage. In the example above where each module operates at 100V, the EFAD 106 and ERAD 108 can operate at 800V.

In other embodiments where there are more modules, more battery strings, or higher voltages within each module, the EFAD 106 and ERAD 108 can operate at even higher voltages corresponding to the sum of the operating voltage of each module. For reasons that will become clear below, it may be desirable for EFAD 106 and ERAD 108 to each be capable of providing propulsion even when a lower voltage is received. That is, EFAD 106 and/or ERAD 108 can be configured to operate even if only powered by first battery string 100 alone, or only if powered by second battery string 102 alone. In the example above, that is, EFAD 106 and ERAD 108 would each be capable of driving vehicle propulsion at 400V.

For clarity, the electric motors of the vehicle are not shown in FIG. 1. However, it should be understood that EFAD 106 can be coupled to one electric motor (driving all front wheels) or it could serve as a power bus that routes power to each of several drive wheels at the front of the vehicle. Likewise, ERAD 108 could be coupled to one rear motor or could route power to a number of rear wheels. In passenger vehicles, the number of drive wheels at the front of the vehicle by EFAD 106 will typically be two, and the number of drive wheels at the back served by ERAD 108 will also be two. However, the concepts described herein are not so narrow as to be limited to such embodiments. It should be understood that in tricycle embodiments, EFAD 106 could serve a single front wheel while ERAD 108 could serve a pair of rear wheels. On the other hand, for cargo trucks or articulated buses, there could be significantly more than four total drive wheels. The number of EFAD and ERAD connections in such embodiments will vary based on the vehicle geometry. For example, an 18-wheel tractor trailer for long-distance driving may benefit from having nine connections to power distribution buses like EFAD 106 and ERAD 108.

FIG. 1 also shows high-voltage components 110. These high-voltage components 110 can include components that operate at high voltage levels, but are not directly associated with propulsion. For example, steering, battery cooling, and autonomous drive features can use high voltage input, but (with the exception of autonomous drive) are never responsible for moving the vehicle. Autonomous drive, likewise, can be powered by high voltage but during some or all of normal use may not be activated. In FIG. 1, these high-voltage components 110 receive power from the EFAD 106, but in alternative embodiments they could receive power from the ERAD 108 or could be coupled to the battery strings 100 and 102 directly.

In addition to loads that consume power, FIG. 1 also shows DC charging bus 112. DC charging bus 112 can be, for example, a charging port of the vehicle that receives high voltage power from an external source that is routed to battery strings 100 and 102. In embodiments, the voltage received at the DC charging bus 112 can be the same as the nominal voltage of the battery strings 100 and 102, or the voltage can be manipulated through appropriate circuitry (not shown) to recharge the battery strings 100 and 102. Typical recharging voltages are between about 120V and about 600V, and DC charging bus 112 can be configured to receive power at any of these voltages for recharging purposes in some embodiments.

Each of the first battery string 100 and the second battery string 102 is separately electrically coupled to DC/DC transformer 104. Likewise, each of the first battery string 100 and the second battery string 102 is electrically coupled to the EFAD 106 and other 800V components, as well as the ERAD 108. In sum, each of the DC/DC transformer 104, the EFAD 106, the ERAD 108, and the high-voltage components 110 are coupled to both of the battery strings 100 and 102. One notable difference, however, is that the DC/DC transformer 104 receives power from both strings at separate inputs, whereas the other components 106, 108, and 110 receive power from both battery strings 100 and 102 at a common input.

Figure 2:
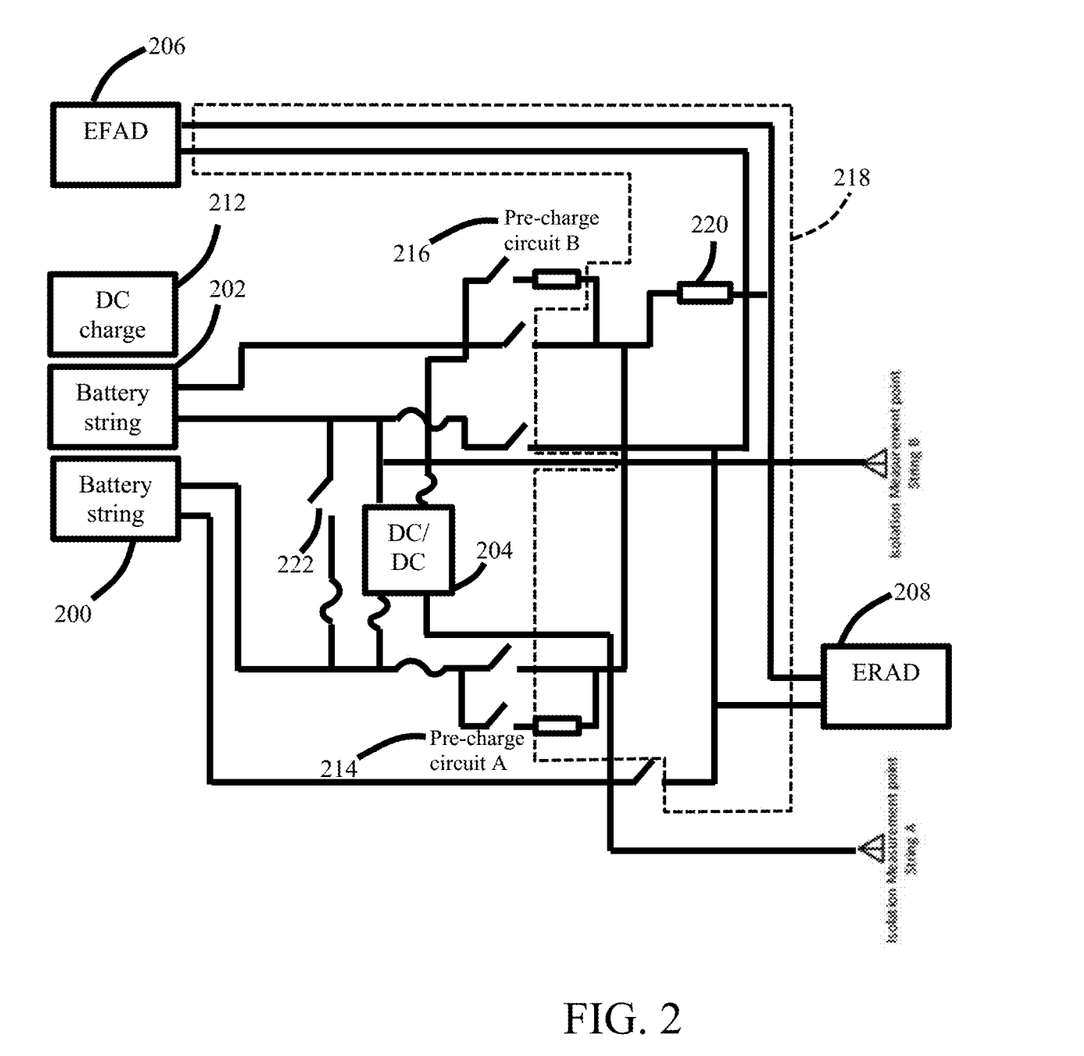
FIG. 2 is a schematic diagram depicting a battery disconnect unit, in accordance with an embodiment of the disclosure.

Turning now to FIG. 2, the voltage levels of the system of FIG. 1 is depicted in a simplified schematic. Throughout FIG. 2 and the rest of this document, like components are depicted in the drawings having like reference numbers iterated by a factor of 100. For example, battery string 100 of FIG. 1 is functionally equivalent to battery string 200 of FIG. 2. A description of each component that has been discussed with respect to a previous figure will not be repeated, to avoid redundancy.

As shown in FIG. 2, battery strings 200 and 202 are each coupled to a corresponding pre-charge circuit: first battery string 200 is coupled to pre-charge circuit A (214) while second battery string 202 is coupled to pre-charge circuit B (216). Additionally, each of the battery strings 200, 202 are separately coupled to DC/DC transformer 204.

In addition to those previously-described components at the pre-charge circuits 214, 216, FIG. 2 shows high-voltage portion 218, surrounded in dashed lines. That is, the components electrically downstream from the pre-charge circuits A and B (214, 216) are combined such that EFAD 206 and ERAD 208 are both powered at high voltage from the high-voltage portion 218 during normal operation.

FIG. 2 also shows power disconnect device (PDD) 220 and relay 224. PDD 220 can be used to disconnect power in an emergency event. Meanwhile, relay 222 can be used to couple the two battery strings 200 and 202 in parallel when the switch is closed such that the power output at high-voltage portion 218 is the sum of the voltages of the two battery strings 200 and 202.

Notably, DC/DC transformer 204 receives power from both first battery string 200 and second battery string 204, regardless of the states of the power disconnect 220 or the relay 222.

In operation, the isolation measurement points (shown using the conventional symbol therefore) can detect abnormalities to operate PDD 220, relay 222, and the other switches shown in FIG. 2. When the voltage output at each of the battery strings 200, 202 is within normal parameters, relay 222 is closed, high-voltage portion 218 is at high voltage, and DC/DC transformer 204 receives power from both strings simultaneously. If either battery string is putting too much power into the DC/DC transformer 204, the fuses (shown with the conventional symbol thereof in FIG. 2) will be blown, but DC/DC transformer 204 will still be powered by the remaining battery string. On the other hand, if one of the battery strings 200, 202 is not outputting power (or if the power output is at low voltage, DC/DC transformer 204 can still be operated by the power input from the other battery string.

Figure 3:
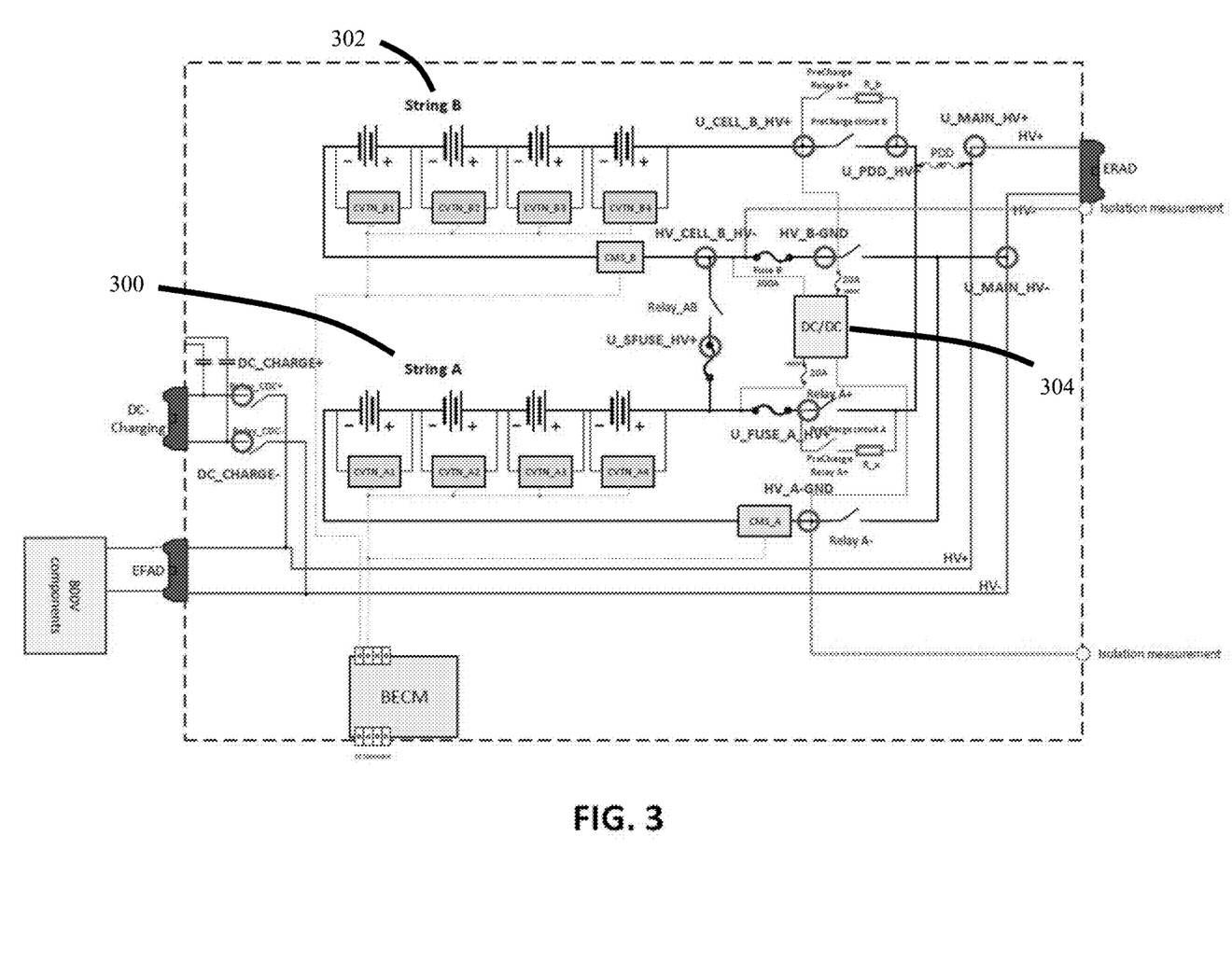
FIG. 3 is the schematic diagram of FIG. 1 depicting one or more locations within the high-voltage battery system for the monitoring of battery conditions, in accordance with an embodiment of the disclosure.

FIG. 3 shows the simplified system of FIG. 2 applied to the more specific case of FIG. 1. As shown in FIG. 1, during use the switch Relay AB (similar to relay 222 of FIG. 2) can be closed, thereby connecting the positive outputs from first battery string 300 to the negative pole of second battery string 302 with the switch labeled HV_B-GND and the switch labeled HV_A-GND open. That is, the point labeled U_MAIN_HV+ will be at a voltage difference from the point labeled U_MAIN_HV− by the net voltages of all the modules within the first and second battery strings 300 and 302.

Otherwise, if one cell should be disconnected from operation due to a failure or abnormal operation, Relay AB can be opened (or, causing the same effect, the fuse U_SFUSE_HV+ may be blown) and the switches corresponding to the remaining operable string can be closed. That is, if first string 300 is still operational as determined by an isolation measurement, Relay A− and Relay A+ may be closed while Relay AB is open, for example.

It should be understood that the same applies in reverse to charging: when DC_CHARGE+ and DC_CHARGE− are receiving power, the corresponding switches are closed and can charge both strings (with Relay AB closed) or a single string (with Relay AB open and the switches corresponding to just one string closed).

There may be benefits to charging one string at a time. For example, charging one string at a time can help to balance a charge level between the two strings. In other contexts, one string may be too warm or too cold to safely receive DC charging. DC charging can also be routed to components such as a battery cooler or heater (at the module marked 800V components) either independently, or while charging one or both of the battery strings 300, 302.

Other benefits of such a system can include:
Maintaining autonomous drive at 400V when one battery string is offline;
Selective power distribution to vehicle systems during a power failure event (e.g., safety systems first, battery cooling second, autonomous drive third, accessories last);
Compensating for an event that would otherwise put a separated 12V system offline (e.g., during rear-end collision where 12V batteries are often housed), including selective power distribution when limited 12V power siphoned off the 400V or 800V system is available;
Using a solar panel or other low-current feature to balance battery string charge levels over a longer duration; and
Vehicle-to-grid power applications, or electronic storage systems, that benefit from multi-string architectures.

Figure 4:
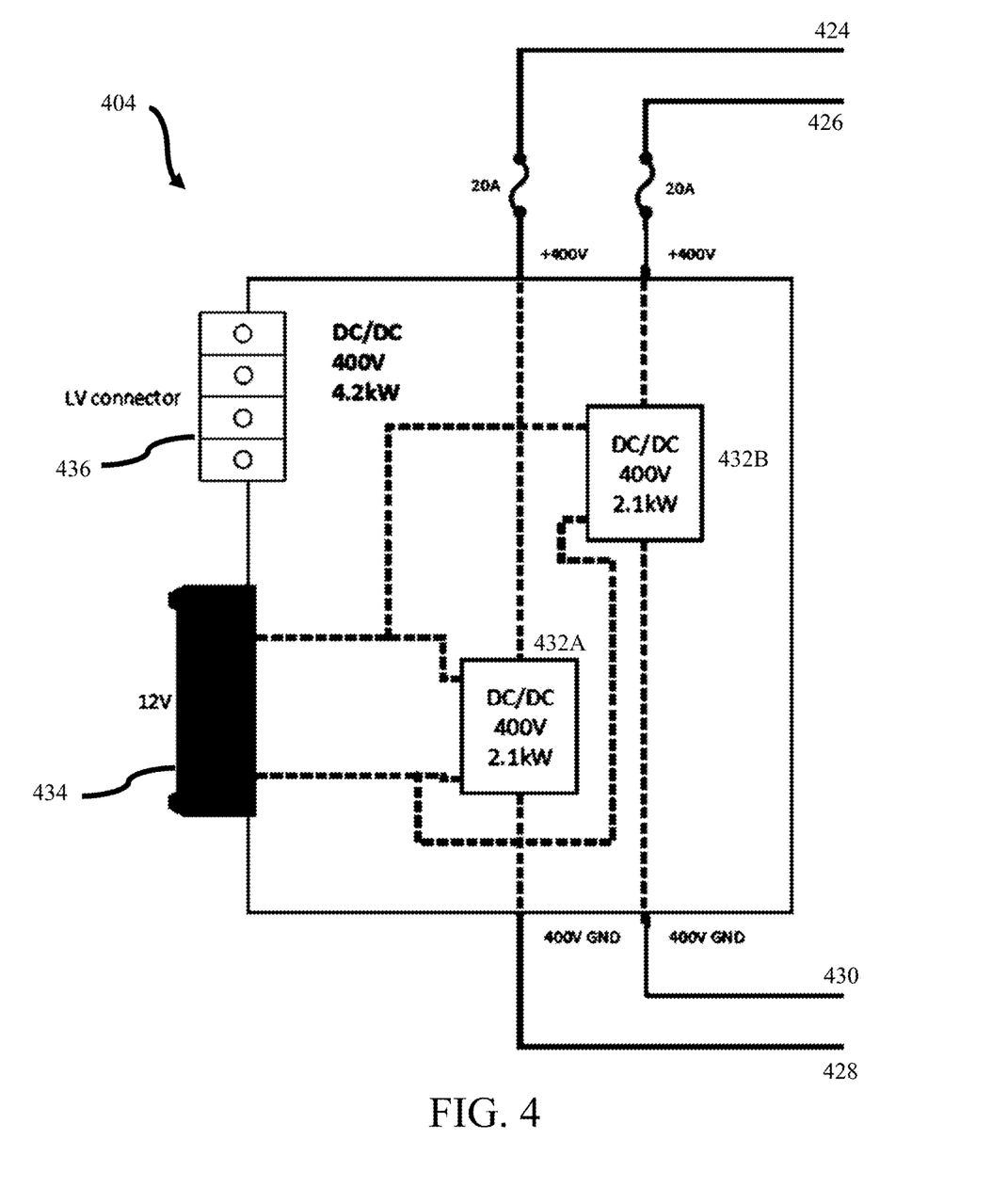
FIG. 4 is a schematic diagram depicting a DCDC converter with dual 400 V input, in accordance with an embodiment of the disclosure.

FIG. 4 is a more detailed schematic view of a DC/DC transformer 404 according to an embodiment. According to this embodiment, there are two 400V inputs, inputs 424 and 426. Each is independent of the other and provides power, such as from its own corresponding battery string as described above with respect to FIGS. 1-3. Likewise, each of the 400V inputs 424 and 426 has a corresponding ground line 428 and 430, respectively.

The first pair of input and ground (424 and 428) are coupled to a first transformer circuit 432A. the second pair of input and ground (426 and 430) are coupled to a second transformer circuit 432B. Each of these is coupled, in parallel, to the 12V bus 434 and low-voltage connectors 436.

The arrangement shown in FIG. 4 provides several advantages. First, as described above with respect to FIGS. 1-3, even when one of the input voltage lines 424 and 426 is disconnected, inoperable, or otherwise unable to provide steady input power, the other of the input voltage lines may still maintain low voltage power output. Second, because of the specific design shown in FIG. 4 that includes two transformer circuits 432A and 432B, even if one of the transformer circuits is damaged or otherwise inoperable, the other may continue providing low-voltage output.

In alternative embodiments, of course, it is possible to have a single transformer circuit that receives power from both inputs 424 and 426, in parallel rather than in series. Such a design trades lower weight and complexity for reduced redundancy, which may be a worthwhile tradeoff in some circumstances. As described previously, in embodiments there maybe more than two battery strings, in which case having a separate transformer circuit for each string may be inefficient or impractical. It is possible, therefore, to design a DC/DC transformer similar to that shown in FIG. 4 that includes an appropriate number (between 1 and many) of transformer circuits, based upon the amount of redundancy desired. Designs may take into consideration the number of battery strings (for example, there may be one transformer circuit per battery string as shown in FIG. 4).

As shown in FIG. 4, each transformer circuit 432A, 432B is capable of outputting 2.1 kW of power at 12V. This power level is ample for purposes of operating safety features of a vehicle such as door locks, telemetry, and window motors. In some vehicles, the output of each circuit 432A, 432B can be sufficient to operate all of the low-voltage features. In other vehicles and embodiments, the power output of a single transformer circuit 432A/432B may be insufficient to simultaneously operate all of the low-voltage systems. This is especially true for vehicles that include many non-essential but high power consumption accessories such as seat heaters, stereo systems, in-vehicle entertainment systems, etc. By use of appropriate software, 12V bus 436 can route power selectively to these low-voltage systems to ensure that safety features are powered before those that are non-essential, should there be insufficient power to operate all of the systems at the same time. In embodiments, such software can communicate to the driver (either through an in-vehicle display, audio, dashboard indicator light, or communication to the user's phone) that the 12V systems have been limited and direct the driver to seek assistance.

In some circumstances, such as during a runaway thermal event in one battery string, maintaining 12V power facilitates the communication of error messages to the user indicating that the vehicle should be evacuated. Furthermore, the vehicle can continue to operate telemetry or navigation systems on low voltage that permit appropriate fire or rescue services to locate the vehicle. Most importantly, electric vehicles often incorporate design features such as flush door handles and fully-automatic door locks and window motors. In the event that the vehicle would become unsafe due to a battery failure or a collision, the systems described in FIGS. 1-4 provide continued power to those features. That is, not only can people within the cabin be alerted to a dangerous condition, but those occupants are able to exit the vehicle safely and easily.

Figure 5:
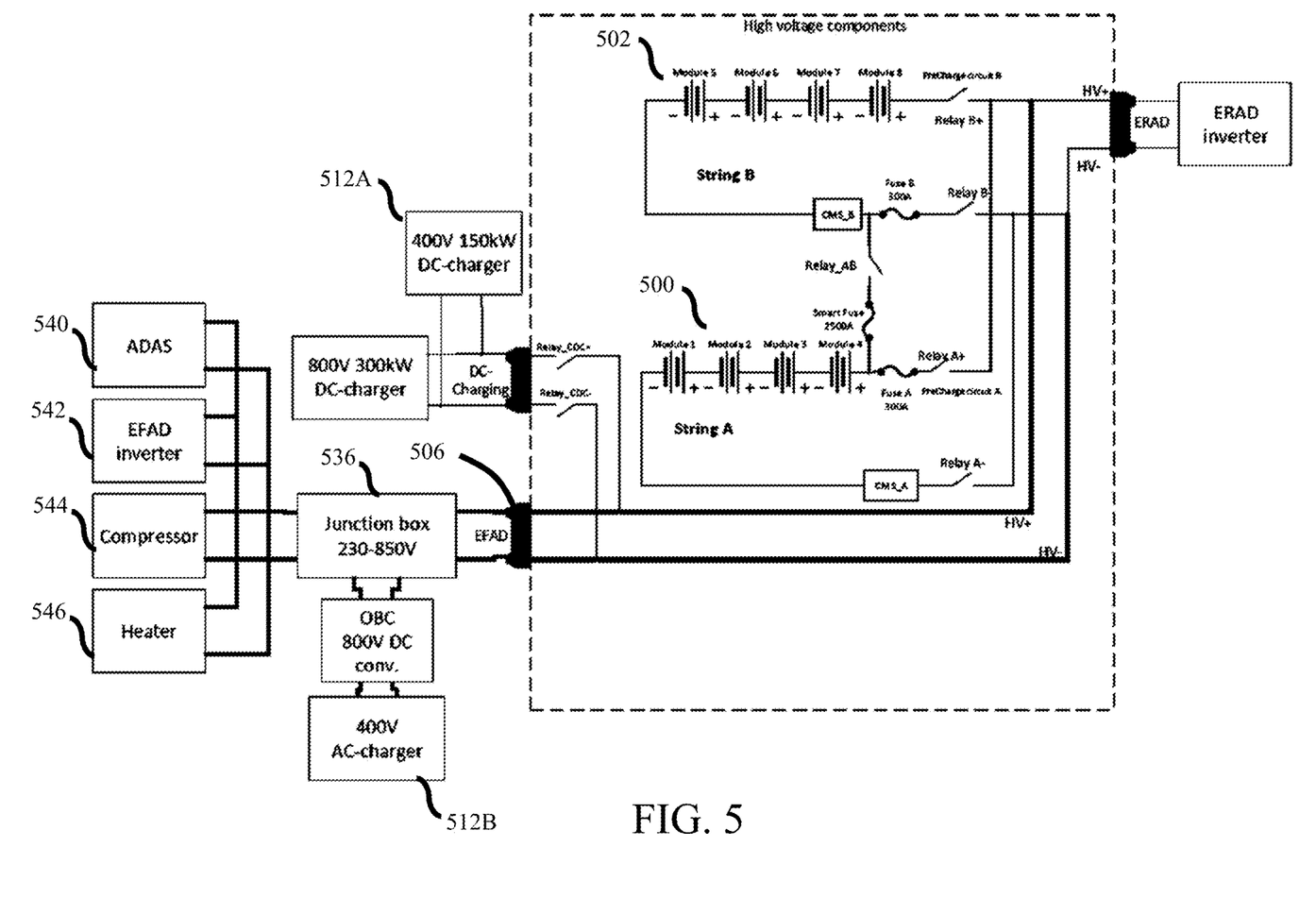
FIG. 5 is a schematic view of a wiring system that includes several mid- to high-voltage components, according to an embodiment.

FIG. 5 shows a schematic view of a system similar to those previously described with respect to FIGS. 1-3, but with more detail shown for the high-voltage components that can be coupled to the EFAD 506. For simplification of the drawings and clarity, other components including the DC/DC transformer system described earlier have been omitted from this view.

FIG. 5 demonstrates two possible charging mechanisms. The first is AC charger 512A, which is shown as a 400V AC charging system. It should be understood that depending on the type of power supply, the AC power could be delivered at a variety of frequencies and voltages, which are converted prior to being delivered to junction box 536. The second power supply, DC power supply 512B, routes power to the EFAD 506 as described in previous drawings, which then routes power to junction box 536.

As shown in FIG. 5, junction box 536 is a general distribution bus capable of delivering power within a range from 230-850V in a vehicle having 800V of total battery module output. That is, junction box 536 is capable of delivering power at the middle-range voltages and at high voltage ranges. Junction box 536 is coupled to loads 540-546 that each consume power within this range.

Advanced driver-assistance systems (ADAS) 540 can include many things, including sensors, actuators, processors, and other subsystems configured to maintain a vehicle within its lane, at proper speed, driving safely. In embodiments, ADAS 540 can be coupled to EFAD converter 542, which powers the drivetrain itself. Compressor 544 can be used for multiple purposes, including climate control (that is, air conditioning) as well as cooling a fluid that is used to maintain battery temperature within a desired range. In embodiments, multiple compressors 544 can be powered from junction box 536, to separate these functions, while in other embodiments a single compressor can perform both functions. Likewise, heater 546 can be either used for cabin heat or for battery (or other mechanical component) heating, or in embodiments a single heater can be used for both functions.

In embodiments, elements that are powered by junction box 536 can be operable at the full, high-voltage output level from the combined battery strings, or they can be operable at the voltage from a single string. In some cases, components powered by junction box 536 can operate at either voltage.

According to one embodiment, compressor 544 is configured to cool both battery strings 500 and 502. In the event of damage to one battery string (500 or 502), such as due to a runaway thermal event or a collision, heat can begin to buildup in the damaged cells. It is well-established that this reaction will continue if left unchecked, with additional heating causing additional breakdown of the battery until, if left unchecked the battery cells can combust. For this reason, electric vehicles include a number of safeguards including thermal shielding, venting, and monitoring. These safeguards, however, take up volume and weight in the battery tray that reduces vehicle range. As battery capacity increases, the capacity for thermal runaway and the amount of power dissipated during such an event increases, such that more and more shielding and monitoring is required.

However, it is also known that with cooling, such runaway events will not propagate to adjacent cells, and in some cases can be halted altogether. Notably, in this embodiment compressor 544 has redundant power supply and can operate from either supply independently. That is, if first battery string 500 is damaged and a thermal event begins, the second battery string 502 still provides power to the EFAD 506 (as described in FIGS. 1-3), which in turn powers junction box 536 to drive compressor 544, and compressor 544 chills the cells within the damaged first battery string 500.

Contrariwise, if the second battery string 502 is damaged and a thermal event begins therein, the first battery string 500 still provides power to the EFAD 506 (as described in FIGS. 1-3), which in turn powers junction box 536 to drive compressor 544, and compressor 544 chills the cells within the damaged second battery string 502.

In sum, separating the battery into two strings provides redundant power at least in the mid-voltage ranges, and a compressor that is operable within such mid-voltage ranges is sufficient to prevent thermal runaway events without requiring ever more bulky and inefficient spacing between cells and modules.

Figure 6:
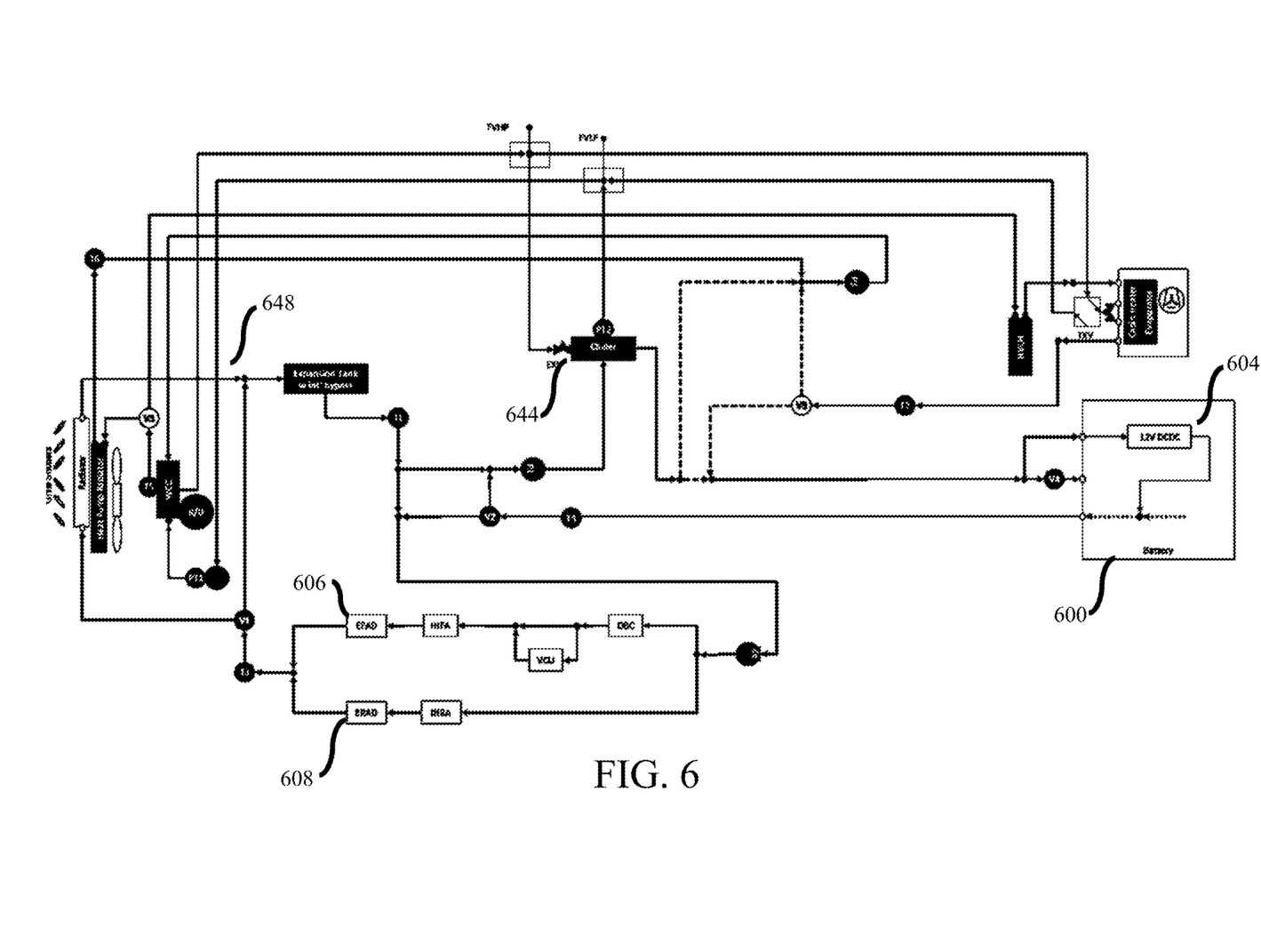
FIG. 6 is a schematic view of a system of valves and pipes configured to selectively cool components of a vehicle according to an embodiment.

FIG. 6 shows a simplified schematic view of a system of valves and pipes that couple the chiller or compressor 644 to a variety of components within the vehicle, which includes both the battery 600 (which it should be understood could include a number of battery strings) and DC/DC converter 604, as well as the EFAD 606 and ERAD 608 and other components. As shown in FIG. 6, it is possible by opening or closing appropriate valves to turn off cooling to some portions of the vehicle while leaving it on for others. For example in the embodiment shown in FIG. 6 it may be desirable after a collision (or after stopping the vehicle in the event of some other cell damage) to turn off cooling to EFAD 606 and ERAD 608 in the loop shown at the bottom of the page. During that time, however, fluid flow could remain between the chiller or compressor 644 and a radiator section 648 of the vehicle for heat exchange, as well as to the section on the bottom-right of the page that includes the battery 600 and the DC/DC transformer 604.

By cutting cooling to loops (such as the bottom loop having the EFAD 606 and ERAD 608) the amount of cooling and fluid flow delivered to the remaining sections can be maintained even in the event that the compressor 644 is operating with reduced voltage. That is, if the compressor is nominally designed to operate at 800V but is receiving only 400V due to a damaged battery string, it may still operate at reduced capacity. But even with this reduced capacity, by selectively operating the valves shown in FIG. 6 it is possible to route sufficient cooling fluid flow to the battery 600 to stop or delay any thermal event so that people in or near the vehicle can remain safe.

Figure 7:
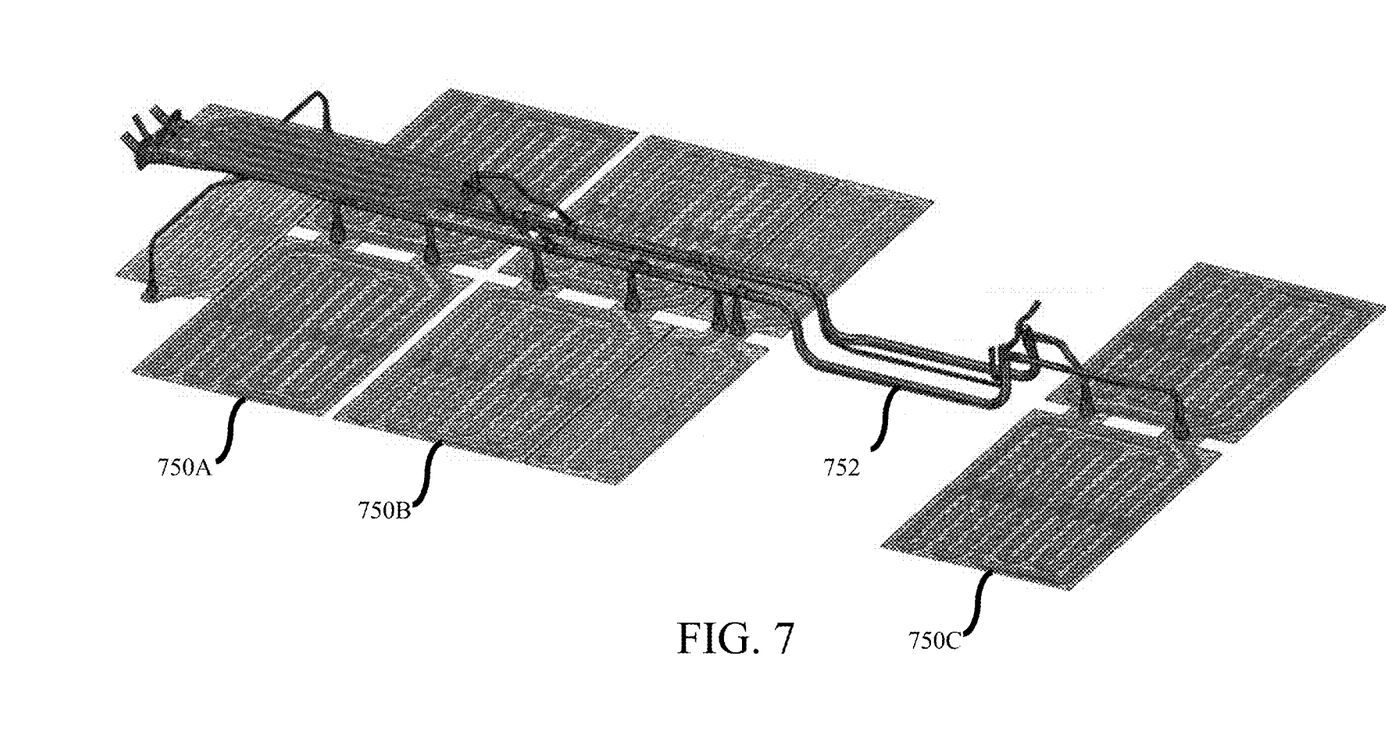
FIG. 7 is a perspective view of a system of cooling panels according to an embodiment.

It should be understood that cooling could be done modularly, as shown in FIG. 7, using even more complex systems of valves. FIG. 7 shows only the cooling flow map for a battery tray having several cooling panels 750A-750C coupled to a central supply pipe system 752. In embodiments, sensors (which could be thermal sensors, pressure sensors, outgassing sensors, or electrical sensors in various embodiments) detect an area that is in need of additional cooling and increase the supply of cooling fluid to the corresponding cooling panel (750A-750C). By selectively cooling panels, the amount of cooling that needs to be delivered from the chiller (e.g., compressor 644 of FIG. 6) can be reduced even further.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A power supply system comprising:
   a first battery string configured to provide power at a first voltage;
   a second battery string configured to provide power at a second voltage;
   a transformer configured to receive power at the first voltage from the first battery string, and configured to receive power at the second voltage from the second battery string, and configured to transform the first and second voltage to a single voltage output;
   wherein the transformer comprises at least two separate inputs and a combined output, and wherein the first battery string and the second battery string are electrically coupled to a respective input of the at least two separate inputs, wherein the at least two separate inputs are configured to simultaneously receive power at the first and the second voltages, and the single voltage output is produced at the combined output by transforming the simultaneously received power;
   a drive system; and
   a relay configured to selectively couple the first battery string and the second battery string to deliver power to the drive system at a voltage equal to a sum of the first voltage and the second voltage.

2. The power supply system of claim 1, wherein the first voltage and the second voltage are a same voltage.

3. The power supply system of claim 1, wherein the transformer is configured to output power at a low voltage level.

4. The power supply system of claim 3, wherein the low voltage level is 12V.

5. The power supply system of claim 3, further comprising a low voltage bus.

6. The power supply system of claim 5, wherein the low voltage bus is configured to power one or more of the group consisting of: a window motor, a door lock, a door handle, a navigation 10 system, and a communication system.

7. The power supply system of claim 2, wherein the first voltage and the second voltage are both 400V.

8. The power supply system of claim 1, wherein each of the first battery string and the second battery string comprise a plurality of battery modules.

9. A vehicle comprising:
a power supply system comprising:
a first battery string configured to provide power at a first voltage;
a second battery string configured to provide power at a second voltage;
a transformer configured to receive power at the first voltage from the first battery string, and configured to receive power at the second voltage from the second battery string, and configured to transform the first and second voltage to a single voltage output;
wherein the transformer comprises at least two separate inputs, and a combined output, and wherein the first battery string and the second battery string are electrically coupled to a respective input of the at least two separate inputs, wherein the at least two separate inputs are configured to simultaneously receive power at the first and the second voltages, and the single voltage output is produced at the combined output by transforming the simultaneously received power;
a drive system; and
a relay configured to selectively couple the first battery string and the second battery string to deliver power to the drive system at a voltage equal to a sum of the first voltage and the second voltage.

10. A method for supplying a low-voltage direct current output from at a high-voltage battery system, the method comprising:
providing a first power output from a first battery string configured to provide power at a first voltage;
providing a second power output from a second battery string configured to provide power at a second voltage;
providing a transformer coupled to both the first battery string and the second battery string, wherein the transformer receives power at the first voltage from the first battery string and also receives power at the second voltage from the second battery string, and transforms the first and second voltage to a single voltage output, wherein the transformer comprises at least two separate inputs, and a combined output, and wherein the first battery string and the second battery string are electrically coupled to a respective input of the at least two separate inputs, wherein the at least two separate inputs are configured to simultaneously receive power at the first and the second voltages, and the single voltage output is produced at the combined output by transforming the simultaneously received power;
providing a drive system; and
providing a relay configured to selectively couple the first battery string and the second battery string to deliver power to the drive system at a voltage equal to a sum of the first voltage and the second voltage.

11. The power supply system of claim 1, wherein the transformer comprises at least two transformer circuits, wherein the at least two separate inputs are electrically coupled to a respective transformer circuit, and wherein the at least two transformer circuits are electrically coupled in parallel to the combined output of the transformer.

12. The power supply system of claim 1, wherein the transformer comprises a single transformer circuit, wherein the at least two separate inputs are electrically coupled in parallel to the single transformer circuit.

13. The power supply system of claim 1, wherein the combined output of the transformer is electrically coupled to a low voltage bus, and the relay is electrically coupled to a high voltage bus.

14. The power supply system of claim 1, wherein the first battery string and the second battery string belongs to a vehicle propulsion battery pack.

15. The power supply system of claim 1, wherein the combined output of the transformer is generated from the at least two separate inputs to the transformer.

16. The power supply system of claim 1, wherein the transformer is configured to enable the single voltage output to be generated from any voltage split between the first battery string and the second battery string.

* * * * *